A. E. MUELLER.
DETACHABLE TREAD STRUCTURE FOR VEHICLE WHEELS.
APPLICATION FILED JAN. 8, 1917.

1,235,718.

Patented Aug. 7, 1917.
2 SHEETS—SHEET 1.

WITNESSES:

INVENTOR
August E. Mueller.
BY William L. Hall
ATTORNEY

UNITED STATES PATENT OFFICE.

AUGUST E. MUELLER, OF CHICAGO, ILLINOIS, ASSIGNOR OF ONE-THIRD TO THOMAS J. HRUBY AND ONE-THIRD TO OTTO J. HRUBY, BOTH OF CHICAGO, ILLINOIS.

DETACHABLE TREAD STRUCTURE FOR VEHICLE-WHEELS.

1,235,715.   Specification of Letters Patent.   Patented Aug. 7, 1917.

Application filed January 8, 1917. Serial No. 141,240.

*To all whom it may concern:*

Be it known that I, AUGUST E. MUELLER, a citizen of Argentina, South America, and a resident of Chicago, in the county of Cook and State of Illinois, have invented certain new and useful Improvements in Detachable Tread Structures for Vehicle-Wheels; and I do hereby declare that the following is a full, clear, and exact description thereof, reference being had to the accompanying drawings, and to the character of reference marked thereon, which form a part of this specification.

This invention relates to improvements in treads for vehicle wheels (some times called lugs) more especially adaptable to the solid rims of tractors for agricultural uses, but may be otherwise applied.

The improvements constituting the present invention are especially applicable to that type of tread shown in my prior U. S. Letters Patent No. 1,205,653, granted on the 21st day of November, 1916, wherein the bars or lugs, which lie across the face of the wheel rim, are connected together by members in such a way that the tread device, as a whole, is extensible and collapsible in the direction of its length, and wherein the said device is adapted to be quickly attached to and quickly detachable from the wheel rim.

The present invention relates more specifically to an improved means for connecting the cross lugs or bars of such a tread device in such a way that any lug or bar may be readily attached to or removed from the device and another substituted therefor.

The invention relates also to novel means for connecting the device to the wheel rim, constructed to permit ready attachment of the device to and its detachment from the wheel rim.

Other objects of the invention are to generally improve and simplify tread devices for wheels of this character, and the invention consists in the combination and arrangement of parts shown in the drawings and described in the specification, and is pointed out in the appended claims.

Figure 1:
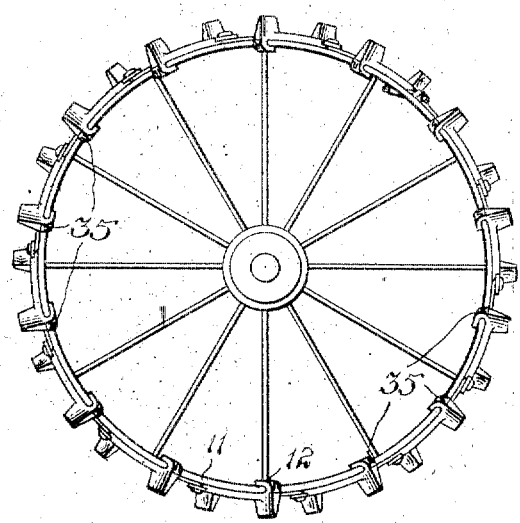
Figure 1 is a side elevation of a wheel equipped with my novel tread device.

The tread shown in Figs. 1 to 7, inclusive, comprises a series of grip bars 10 which are disposed obliquely across the face of the wheel rim 11 and are provided at their ends with inwardly turned hooks 12 which engage over the side edges of the wheel rim. The said hook ends of the grip bars are slightly offset from the longitudinal axes of the bars. The series of bars are connected by links 14, which are also disposed obliquely across the face of the rim and at oblique angles to the bars 10.

One phase of my invention resides in the manner of loosely or pivotally connecting the ends of these links 14 to the ends of bars 10. This connection embraces some kind of a detachable lock joint which provides a reliable connection between the links and bars without the necessity of employing rivets or other fastening means. The connection is also such that the links may be separated from the bars only when said links assume a given or definite relation to the bars and which latter relation is not a normal or operative relation of the parts. Such connection may be made as follows:—

Each of the grip bars 10 is provided near its ends, and on the face of the wheel rim as herein shown, with loops 16, the loops at opposite ends of the links being disposed on respectively opposite sides of the bar. The openings in said loops are elongated in direction transverse to the axes of the bars and are disposed substantially in the direction of the lengths of the connecting links 14. Said loops 16 are slightly curved to conform to the curvature of the wheel rim.

The links 14 are provided at their ends with outwardly bent lugs 18 and said lugs terminate in cross-heads 19. Said cross heads 19 are made of a length somewhat greater than the width of the openings in the loops 16, but are slightly shorter than the lengths of said openings.

Figure 5:
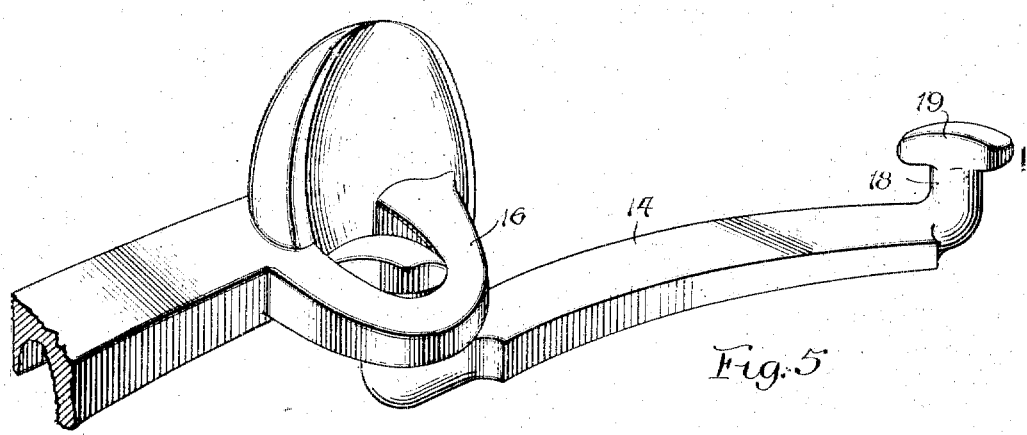
Fig. 5 is an enlarged perspective view, showing the manner of attaching the connecting bars to and detaching them from the tread or grip bars.

The links 14 are connected to the loops of the bars 10 when the said links assume the positions shown in Fig. 5,—that is to say, when said links are in positions to dispose the cross heads of the links in the longer axes of the openings in said loops. After said headed lugs have thus been engaged with the loops, the links are turned to their operative positions, or that obliquely transverse to the bars 10 and the cross heads 19 lie transversely across the openings in the loops 16 so that detachment of the links from the bars cannot occur. The angles of the longer lengths of the loops are such relatively to the axes of the bars 10 that said links cannot swing far enough toward the bars to permit detachment of the links from the bars. Therefore, when the collapsible and extensible tread formed by the series of connected grip bars are folded together for shipment or storage there is no likelihood of the parts becoming detached.

Figure 2:
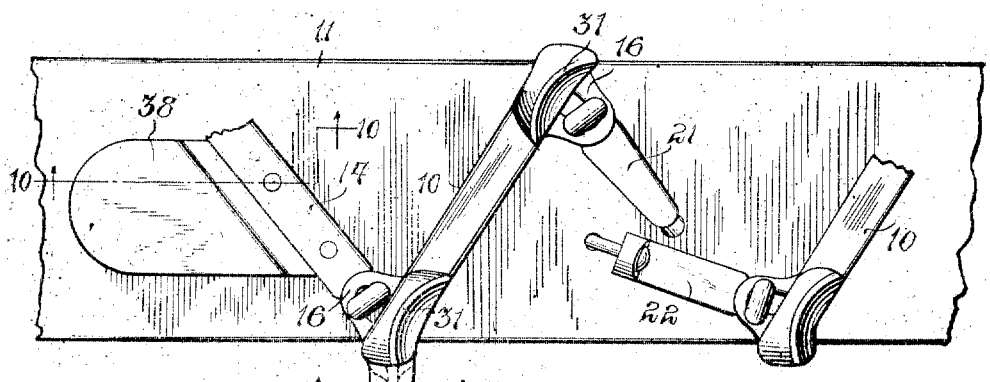
Fig. 2 is an enlarged fragmentary plan view thereof.
Figure 3:
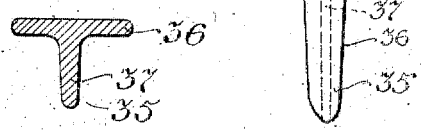
Fig. 3 is a section on the line 3—3 of Fig. 2.
Figure 4:
Fig. 4 is an edge elevation of one of the tread or grip bars.
Figure 6:
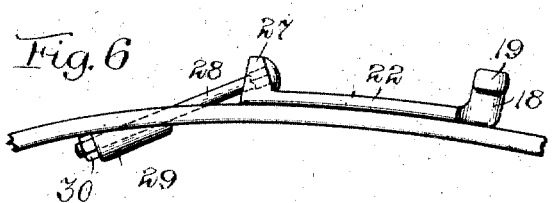
Figs. 6 and 7 are fragmentary details, illustrating the manner of attaching the ends of the tread device to the wheel rim.
Figure 7:
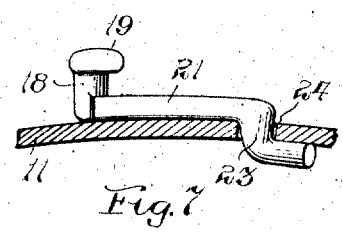

The said series of connected grip bars are attached at their ends to the rim through the medium of shorter links 21, 22 best shown in Figs. 2, 6 and 7. The link 21 is itself detachably interlocked to the wheel rim by means which require no bolts, rivets or the like. As herein shown the link 21 is provided at its free end with an inwardly directed portion 23, which extends through an opening 24 in the wheel rim 11, and a terminal lug 25 which lies inside the rim is generally parallel to the main body of the link 21. The said link 21 may be readily engaged with the opening 24 when the link assumes an oblique angle relatively to the rim, and when the link is laid flat on the rim, the stress of the pull against the link is brought against the inturned portion 23, which is made strong and rugged and the terminal lug 25 prevents detachment of the link from the rim when the link is in its operative position. The link is provided at its other end with a locking lug 18 and cross head 19, similar to the interconnecting links before described, which engages with the loop of an adjacent grip bar 10.

The link 22 is also provided at one end with a headed interlocking lug 18 and is provided at its other end with an upturned apertured lug 27. Through this latter lug 27 and through an oblique opening in the wheel rim extends a fastening bolt 28, the head of the bolt engaging the lug 27. The screw threaded end of the bolt 28 extends through a washer 29, made of a shape to fit the inner face of the wheel rim and having an end face for engagement with the tightening nut 30 of said bolt. The bolt and nut afford means whereby a proper tension may be exerted on the tread structure to hold the same firmly on the rim.

Figure 8:
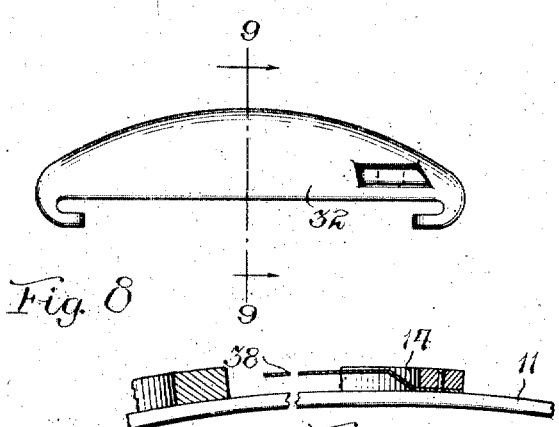
Fig. 8 is a side elevation of another form of tread or grip bar.
Figure 9:
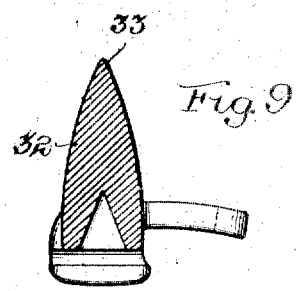
Fig. 9 is a section on the line 9—9 of Fig. 8.

The grip bar may be made of any desired cross section or provided with suitable forms of salients for engagement with the ground. As shown in Figs. 1 to 5 inclusive the bars are provided with scoop-like spurs or salients 31, the concave faces of which face in the direction of rotation of the wheel. In Figs. 8 and 9 is shown a bar 32 which is thickened at its middle to produce a transversely convex engaging face, and this face is sharpened to produce a salient or an edge 33. It will be observed that the interlocking connections between the grip bars and links are offset from the ground engaging faces of the grip bars, so that said connections are thereby protected from first and direct contact with hard roadways, rocks and the like, which tend to break the interlocking parts.

In Figs. 1 and 2 are shown a grip bar extension 35 which is adapted for use on swampy or sandy ground. Said extensions are integral parts of the grip bars 10, which latter may be made of cast metal. The extensions 35 are of T-shape cross section and are arranged with the flat faces of their webs 36 directed flush with the face of the wheel rim, and said webs are strengthened by the flanges 37 which lie along the centers of the webs. This construction produces a very rigid extension having large area of bearing face and efficiently reinforced, and by means which does not add greatly to the weight and cost of the device. Said extensions are disposed at oblique angles to the respective bars so as to lie generally parallel to the axis of rotation of the wheel.

Figure 10:
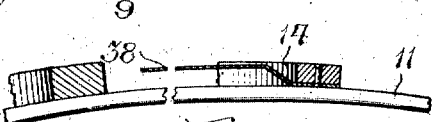
Fig. 10 is a cross-section on the line 10—10 of Fig. 2.

In some instances it is desirable to provide means for clearing the wheel rim and the tread of mud which tends to cling or accumulate on said tread. I have herein shown one form of self-cleaning device which may be employed. It consists of spring plates 38 which lie between the connecting links 14 and the bars 10 and are herein shown as attached to said bars. Said spring plates are raised from their points of attachment above the rim but are, however, within the extreme outer faces or edges of the grip bars 10, as shown in Fig. 10. Said plates may be attached to the links 14 in any suitable manner, as by the rivets shown. The plates are of such resiliency and are so arranged as to hold themselves spaced from the rim. The cleaning plates on the lower side of the wheel however are pressed upwardly against the rim and when they rise from the ground on the rising side of the wheel they spring outwardly and have the effect to loosen dirt tending to cling thereto. The constant movement of the plates therefore, prevents clogging or caking of mud on the rim. It will be understood that the self-cleaning device may assume other specific forms than shown.

It will be furthermore understood that the interlocking connection between the grip bars and links may also be varied within the spirit of the claims hereto appended.

I claim—

1. A tread structure for vehicle wheels, comprising a series of grip bars extending across the wheel rim and shorter members transverse to the bars and extending between and detachably interlocked to the bars near their ends on the face of the rim by connections which are offset inwardly from the road-engaging faces of the grip bars.

2. A tread structure for vehicle wheels which is extensible and collapsible in the direction of its length, comprising a series of grip bars adapted to extend transversely across the wheel rim and having ground engaging salients and tread-forming links shorter than said bars which extend between the grip bars, with means for detachably interlocking them at their ends to the ends of said grip bars between the edges of the salients and the rim.

3. A tread structure for vehicle wheels comprising a series of grip bars adapted to extend diagonally across the wheel rim and having hooked ends to engage over the edges of the rim, and provided near their ends with openings and links adapted to extend diagonally across the wheel rim and provided at their ends with enlargements to detachably and interlockingly engage said openings, each link being thus connected to opposite ends of neighboring bars.

4. A tread structure for vehicle wheels comprising a series of grip bars adapted to extend diagonally across the wheel rim, links adapted to extend also diagonally across the wheel rim between said bars and detachable interlocking means between said links and bars constructed with means to permit the links to swing toward and from the bars in their planes, and to permit detachment of the links from the bars only when the links approach parallelism to said bars.

5. A tread structure for vehicle wheels comprising a series of bars adapted to extend diagonally across the wheel rim, links extending between said bars and diagonally transverse thereto, the bars being provided near their ends with loops and the links being provided with hooks to detachably interlock with said loops, said loops being elongated in a direction obliquely transverse to the axes of the bars and the bars provided with headed terminals which, in the normal positions of the links, lie transversely across the loops.

6. An endwise collapsible tread structure for vehicle wheels comprising bars adapted to extend transversely across the wheel rim, with means to loosely connect them together and means to attach the structure to the wheel rim embracing a link having means to detachably interlock it to an end bar of the series and provided with an offset end to engage an opening in the wheel rim.

7. A tread structure for vehicle wheels which is extensible and collapsible in the direction of its length, comprising a series of grip bars extending transversely across the wheel rim and provided at their ends with hooks to engage over the edges of the rim, and means extending between and flexibly connected to said grip bars, said grip bars being formed beyond said hooks at one side of the rim with road engaging extensions.

8. A grip bar for tread structures for vehicle wheels adapted to extend diagonally across the wheel rim and provided with rim engaging hooks and provided also at one end beyond an adjacent hook with an extension disposed at an angle to the longitudinal axis of the grip bar and having a broad road engaging face.

9. A grip bar for tread structures of vehicle wheels adapted to extend across the wheel rim and provided with hooks to engage over the edges of the wheel rim, said grip bar being provided at one end with a T-shape road engaging extension.

In witness whereof I claim the foregoing as my invention, I hereunto append my signature in the presence of two witnesses at Chicago, Illinois, this 6th day of January, 1917.

AUGUST E. MUELLER.

Witnesses:
W. L. HALL,
A. E. WALBRIDGE.